(12) United States Patent
Lee (10) Patent No.: US 8,820,153 B2
(45) Date of Patent: Sep. 2, 2014

(54) TEST STAND HAVING A VIBRATION DAMPER

(75) Inventor: Joon-Kyu Lee, Langen (DE)

(73) Assignee: Horiba Europe GmbH (DE)

( * ) Notice: Subject to any disclaimer, the term of this patent is extended or adjusted under 35 U.S.C. 154(b) by 0 days.

(21) Appl. No.: 13/399,258

(22) Filed: Feb. 17, 2012

(65) Prior Publication Data
US 2012/0260725 A1 Oct. 18, 2012

Related U.S. Application Data (63) Continuation of application No. PCT/EP2010/004510, filed on Jul. 22, 2010.

(30) Foreign Application Priority Data

Aug. 26, 2009 (DE) .......................... 10 2009 038 849

(51) Int. Cl.
G01M 19/00 (2006.01)

(52) U.S. Cl.
USPC ..................................................... 73/116.01

(58) Field of Classification Search
USPC ............... 73/116.01, 116.02, 116.04, 116.05, 73/116.06
See application file for complete search history.

(56) References Cited

U.S. PATENT DOCUMENTS

| | | | | |
|---|---|---|---|---|
| 4,989,458 A * | 2/1991 | Suzuki | ........................ | 73/862.09 |
| 5,829,320 A | 11/1998 | Abraham et al. | | |
| 6,405,585 B1 * | 6/2002 | Hewitt | ........................ | 73/116.05 |
| 6,439,037 B1 | 8/2002 | D'Angelo | | |
| 7,107,829 B2 * | 9/2006 | Tachiki | ........................ | 73/115.01 |
| 8,381,579 B2 * | 2/2013 | Sato et al. | .................... | 73/117.03 |
| 2005/0257606 A1* | 11/2005 | Tachiki | ......................... | 73/118.1 |
| 2011/0011168 A1* | 1/2011 | Schrotter | .................... | 73/116.02 |
| 2011/0011169 A1* | 1/2011 | Schrotter | .................... | 73/116.02 |

FOREIGN PATENT DOCUMENTS

| | | |
|---|---|---|
| DE | 32 45 041 | 12/1982 |
| DE | 39 10 454 | 12/1989 |
| DE | 39 42 016 | 12/1989 |
| JP | 58 146745 | 9/1983 |
| JP | 02-154826 | 6/1990 |
| JP | 03-25048 | 9/1992 |
| JP | 05-126683 | 5/1993 |

(Continued)

OTHER PUBLICATIONS

Office Action dated Jun. 4, 2013 in Japanese Application No. 2012-525895.

(Continued)

*Primary Examiner* — Eric S McCall
(74) *Attorney, Agent, or Firm* — Mayback & Hoffman, P.A.; Gregory L. Mayback; Rebecca A. Tie

(57) ABSTRACT

A rotation test stand for a test specimen includes a load device for generating a load for the test specimen, a test specimen accommodation for accommodating the test specimen and for transmitting the load to the test specimen as well as a measuring device for measuring a measured variable acting on the test specimen. Provision is furthermore made at a suitable location for a vibration damping device for damping vibrations, which arise in the test stand. The vibration amplitudes are to be reduced, in particular, by a torsional vibration damper or a linear vibration damper. The vibration damper can be disposed in the drive train or at the measuring device.

21 Claims, 4 Drawing Sheets

(56) References Cited

FOREIGN PATENT DOCUMENTS

| | | |
|---|---|---|
| JP | 08-210949 | 8/1996 |
| JP | 11-325182 | 11/1999 |
| JP | 2000-161437 | 6/2000 |
| JP | 2005-030466 | 2/2005 |
| JP | 2007-182986 | 7/2007 |
| WO | 93/03342 | 2/1993 |
| WO | 97/40286 | 7/2000 |
| WO | 2005/116604 | 12/2005 |
| WO | 2010014460 A1 | 2/2010 |

OTHER PUBLICATIONS

Japanese Patent App. No. 2012-525895 Decision to Grant dated Mar. 11, 2014.

* cited by examiner

TEST STAND HAVING A VIBRATION DAMPER

CROSS-REFERENCE TO RELATED APPLICATIONS

This is a continuing application, under 35 U.S.C. §120, of copending International Application No. PCT/EP2010/004510, filed Jul. 22, 2010, which designated the United States and was not published in English; this application also claims the priority, under 35 U.S.C. §119, of German Patent Application No. 10 2009 038 849.4, filed Aug. 26, 2009; the prior applications are herewith incorporated by reference in their entirety.

STATEMENT REGARDING FEDERALLY SPONSORED RESEARCH OR DEVELOPMENT

Not Applicable

FIELD OF THE INVENTION

The present invention lies in the field of test stand. The present disclosure relates to a test stand having a vibration dampener. The invention relates to a rotation test stand for a test specimen.

BACKGROUND OF THE INVENTION

Such test stands are used, in particular, for testing vehicles and vehicle components, such as, e.g., internal combustion engines, drive trains and brakes. The test specimen is thereby coupled to a load device and the load, which acts between test specimen and load device, is monitored. To test an internal combustion engine, the load device acts as brake and can be realized, e.g., by a dynamometer, a hydraulic brake, or an eddy current brake. To test a brake, the load device must be embodied as a drive device and can be realized, e.g., by a dynamometer (e.g., a direct current motor). The load device, the test specimen, and the measuring device are coupled to one another by suitable components, such as, e.g., drive shafts, couplers and levers, so as to be able to reliably transmit the acting torques and forces.

Different solutions are known as measuring devices. It is thus possible, e.g., to install a torque-measuring flange into the connecting strand between load device and test specimen. It is likewise known, e.g., to support the load device or also the test specimen so as to oscillate and to support the torques resulting during operation via a lever, which acts against a force-measuring device.

The testing of the test specimen typically requires an operation with different rotational speeds and torques, so as to be able to simulate an actual operation between idle state and full load.

The different components of a test stand respectively represent—mechanically abstracted—spring-mass systems. In particular, in the case of larger test stands, the components thus encompass relatively low natural frequencies. This also relates, in particular, to torsional vibrations.

The test specimens, as well as the load device, generate rotational vibrations and linear vibrations, which are introduced into the test stand and which are transmitted via the components of the test stand. Due to the fact that the test specimens can be operated in a wide speed range, it cannot be avoided that the vibrations generated by the test specimens coincide with resonance frequencies of other components of the test stand. The excitation of a component with a frequency in the natural frequency or resonance range, respectively, leads to an excessively strong vibration loading of the respective component and of the adjacent aggregates, whereby parts of the test stand can be damaged, but, at least, measuring results can be distorted.

In the event that vibrations, which coincide with resonance vibrations from one of the components, in particular, the measuring device, are generated during the operation of the test stand, strong vibration exaggerations occur at the respective component, which distort the measuring result or even make it impossible to measure the actual load.

It is known from German Published, Non-Prosecuted Patent Application DE 39 10 454 A1, corresponding to U.S. Pat. No. 4,989,458 to Suzuki, to correct the measuring signal with the help of an electronic circuit, so as to eliminate vibration influences in the vicinity of resonance frequencies.

Japanese Patent Document JP 58176531 describes a solution, in which a spring assembly is installed in the flux of force between a lever arm, which is fastened to a dynamometer that is supported so as to oscillate, and a force-measuring device that is connected to the end of the lever arm. Attempts are made with the help of the spring assembly to shift the natural frequency of the lever arm-force-measuring system into an uncritical range.

For the most part, measures for shifting the frequencies into overcritical or subcritical frequency ranges are not helpful in the case of test stands, because the test specimens are to be tested under conditions that are as real as possible. In this manner, a vibration-critical behavior, e.g., of a test specimen is to be determined. But, a shifting of resonance frequencies would prevent this.

The damping of the vibrations with the help of a coupling or compensating coupling, respectively, in the drive train or the reduction of the excitation (changing the test specimen itself) is also not acceptable in practice, because it calls into question the capability to transfer the test stand results to actual practice.

Thus, a need exists to overcome the problems with the prior art systems, designs, and processes as discussed above.

SUMMARY OF THE INVENTION

The invention provides a test stand having a vibration dampener that overcomes the hereinafore-mentioned disadvantages of the heretofore-known devices and methods of this general type and that provide such features with a reduction of the interference of resonance frequencies.

A rotation test stand for a test specimen encompasses a load device for generating a load for the test specimen as well as a test specimen accommodation for accommodating the test specimen and for transmitting the load to the test specimen, a measuring device for measuring a measured variable acting on the test specimen, and a vibration damping device for damping vibrations, which arise in the test stand.

The specified test stand thus does not comprise the test specimen itself. Instead, the test specimen can be inserted into the test specimen accommodation by the customer or user, respectively, of the test stand as desired and can be coupled at that location to the load, which is generated by the load device. The system boundary of the test stand thus ends directly at the test specimen.

The test specimen accommodations can thus encompass, in particular, a support for the test specimen as well as connecting elements for coupling the test specimen to the test stand and for transmitting the load from the load device to the test specimen. The system boundary of the test stand thus runs between the test specimen accommodation and the test specimen itself, which is to be provided by the operator.

A classic test stand is thus specified according to the invention, in which provision is additionally made for a vibration damping device (hereinbelow also referred to as vibration damper). A vibration damper (e.g., a tuned mass damper—TMD) is an undamped or damped spring-mass system comprising mechanics, which provides an auxiliary oscillator, which can considerably reduce the amplitude of a system, which vibrates in response to a resonance frequency. The vibration damper is coupled to the system, which is to be steadied, in that it is fastened at a suitable location—sensibly at a location comprising a high vibration amplitude.

The mechanical system of the vibration damper accordingly encompasses a fastening device, which supports the remaining damper. The system comprises a mass (also mass device comprising a plurality of masses, e.g.), which is movable relative to the fastening device. The mass is coupled to the fastening device via a spring and/or damping device (hereinbelow also identified as spring device for short). The spring device can encompass, e.g., an elastomer element (e.g. rubber) comprising a corresponding stiffness and damping or also other suitable materials, such as, e.g., a viscous fluid. The mass is determined by the mass of the system, which is to be steadied, and should be approximately 5 to 10% of the system mass in the optimal case, but can also be lower for weight and space reasons. Frequency, mass and damping must be adjusted optimally to one another when designing the vibration damper.

The vibration damper can thus encompass a passive or active vibration damping device or can be an undamped, a damped, or a viscous damper, respectively.

The vibration damper makes it possible for resonances to be damped considerably or even eliminated completely in the range of a natural frequency of a system, which is to be steadied, depending on the adjustment of the system.

The vibration damper is not to be disposed in the flux of force between the components of the test stand. However, it can easily be installed in the immediate vicinity of components, which are located in the flux of force.

In particular, the vibration damping device can be disposed at a location, chosen from any of the following: at a connecting strand between the load device and the test specimen accommodation; at a connecting strand between the test specimen accommodation and the measuring device; at a connecting strand between the load device and the measuring device; at the load device itself; at the test specimen accommodation; and/or at the measuring device.

Depending on the situation, a location (or also several locations) can thus be determined, at which the vibration damping device is to be placed in an advantageous manner. When configuring and designing the vibration damping device, however, it must be noted that vibration amplitudes, which stem from the test specimen itself, are not eliminated, if possible. First and foremost, it is the purpose of the test stand to detect and analyze the behavior of the test specimen. It should, thus, also be possible to detect, but not eliminate the vibration characteristics or the torsional vibrations, respectively, in the drive shaft of the test specimen (e.g., of an internal combustion engine or a brake).

Provision can easily be made in the test stand for a plurality of vibration damping devices—also comprising different designs—which are disposed at different locations on the test stand. In this manner, it is possible to dispose of interfering amplitudes and resonance frequencies.

The vibration damping device can be a linear vibration damper, wherein the mass device of the vibration damper then encompasses a mass, which can be moved back and forth linearly. For logical reasons, a linear vibration damper should be attached to a component, in which case increased linear vibrations are to be expected in the case of resonance.

In the alternative, the vibration damping device can be a torsional vibration damper, in which case the mass device encompasses a mass, which can be moved back and forth to rotate about an axis (the main axis of the vibration damper). In this case, the mass can be embodied in the shape of a circular ring, e.g., and can be coupled to the fastening device by an inner spring, which is located in the interior of the circular ring. A torsional vibration damper is suitable for accommodating torsional vibrations, as they can appear, e.g., in a drive shaft.

In an alternative case of the test stand, provision is made for at least one linear vibration damper and for at least one torsional vibration damper. Torsional vibrations in the drive train, in particular, between load device and test specimen, can be eliminated in this manner, while the linear vibration damper can be provided at a force-measuring device, which belongs to the measuring device.

The connecting strand between the load device and the test specimen accommodation and/or the connecting strand between the test specimen accommodation and the measuring device and/or the connecting strand between the load device and measuring device can encompass a rotatable shaft. In such a case, the vibration damping device can be a torsional vibration damper, which is on the shaft. It is also noted here that the vibration damper is not inserted in the flux of force or torque, respectively, of the shaft, but is additionally slid onto the shaft.

In the alternative, it is also possible to embody the shaft as a hollow shaft and to position the vibration damper in the interior of the hollow shaft.

In an alternative, the shaft can axially project beyond the respective connecting strand at least towards one side and can form a free end. The vibration damping device can then be on the free end of the shaft. This configuration has advantages with regard to the available space, because the inner area of the test stand, thus the area between load device and test specimen, is not always easily accessible. It suffices when the vibration damper, in particular, a torsional vibration damper, is slid onto the free end of the shaft.

The measuring device can encompass a lever arm, which can be pivoted about a main axis of the test stand, to which a force-measuring device is coupled. The vibration damping device can, then, be a linear vibration damper and can be on the lever arm.

The measuring principle described herein is, in particular, a case in which the load device or the test specimen is supported to oscillate about its main axis. The measuring device encompasses the lever arm, which extends perpendicular to the main axis, through which the torque acting on the test specimen or on the load device is supported. A load cell, which accommodates the force resulting from the acting torque, is coupled to the end of the lever arm. The force-measuring device can, in particular, be formed by a load cell or a similar known device.

In another embodiment, the measuring device encompasses a first lever arm, which can be pivoted about a main axis of the test stand and to which the force-measuring device is coupled. Provision is made opposite the first lever arm and rigidly coupled thereto for a second lever arm, wherein the vibration damping device in the form of a linear vibration damper is on the second lever arm. The first and the second lever arm can be embodied, in particular, in one piece in the form of a pendulum block, which extends substantially symmetrical to a vertical center plane, which extends through the main axis.

With the foregoing and other objects in view, there is provided, in accordance with the invention, a rotation test stand for a test specimen including a load device operable to generate a load for the test specimen, a test specimen accommodation configured to accommodate the test specimen and operable to transmit the load from the load device to the test specimen, a measuring device operable to measure a measurable variable acting on the test specimen, and a vibration damping device comprising one or more mechanical systems and being operable to damp vibrations that arise in any of the load device, the test specimen, the measuring device, and the one or more mechanical systems. The one or more mechanical systems each comprise a fastening device, a mass device operable to be moved relative to the fastening device, and at least one of a spring device and a damping device operatively disposed between the fastening device and the mass device.

With the objects of the invention in view, there is also provided a rotation test stand for a test specimen including a load device operable to generate a load for the test specimen, a test specimen accommodation configured to accommodate the test specimen and operable to transmit the load from the load device to the test specimen, a measuring device operable to measure a measurable variable acting on the test specimen, a vibration damping device comprising one or more mechanical systems and being operable to damp vibrations that arise in any of the load device, the test specimen, the measuring device, and the one or more mechanical systems, and at least one connecting strand. The one or more mechanical systems each comprise a fastening device, a mass device operable to be moved relative to the fastening device, and at least one of a spring device and a damping device operatively disposed between the fastening device and the mass device. The vibration damping device is disposed at a location selected from at least one of the following: at a connecting strand between the load device and the test specimen accommodation, at a connecting strand between the test specimen accommodation and the measuring device; at a connecting strand between the load device and the measuring device, at the load device, at the test specimen accommodation, and at the measuring device.

In accordance with another feature of the invention, there is provided at least one connecting strand, the vibration damping device being disposed at a location selected from at least one of the group consisting of at a connecting strand between the load device and the test specimen accommodation, at a connecting strand between the test specimen accommodation and the measuring device, at a connecting strand between the load device and the measuring device, at the load device, at the test specimen accommodation, and at the measuring device.

In accordance with a further feature of the invention, the vibration damping device is disposed at a location selected from at least one of the group consisting of at a connecting strand between the load device and the test specimen accommodation, at a connecting strand between the test specimen accommodation and the measuring device, at a connecting strand between the load device and the measuring device, at the load device, at the test specimen accommodation, and at the measuring device.

In accordance with an added feature of the invention, the vibration damping device is disposed at a location selected from at least one of the group consisting of at the load device, at the test specimen accommodation, and at the measuring device.

In accordance with an additional feature of the invention, the vibration damping device is a plurality of vibration damping devices disposed at different locations. The different locations are selected from at least one of the group consisting of the load device, the test specimen, the measuring device, and the one or more mechanical systems.

In accordance with yet another feature of the invention, the test specimen accommodation comprises a support operable to support the test specimen and connecting elements operable to couple the test specimen to the test stand and to transmit the load from the load device to the test specimen.

In accordance with yet a further feature of the invention, the vibration damping device is one of a linear vibration damper and the mass device comprises a mass operable to be moved back and forth linearly and a torsional vibration damper and the mass device comprises a mass operable to be moved back and forth so as to rotate about an axis.

In accordance with yet an added feature of the invention, the vibration damping device comprises at least one linear vibration damper and at least one torsional vibration damper.

In accordance with yet an additional feature of the invention,

In accordance with again another feature of the invention, there is provided at least one connecting strand comprising a rotatable shaft between at least one of the load device and the test specimen accommodation, the test specimen accommodation and the measuring device, and the load device and the measuring device, the vibration damping device being disposed on the shaft and being a torsional vibration damper.

In accordance with again a further feature of the invention, one of the load device and the test specimen accommodation are connected by a rotatable shaft, the test specimen accommodation and the measuring device are connected by a rotatable shaft, and the load device and the measuring device are connected by a rotatable shaft, and the vibration damping device is disposed on the rotatable shaft and is a torsional vibration damper.

In accordance with again an added feature of the invention, the load device and the test specimen accommodation are connected by a rotatable shaft, the test specimen accommodation and the measuring device are connected by a rotatable shaft, the load device and the measuring device are connected by a rotatable shaft, and the vibration damping device is disposed at least one of the rotatable shafts and is a torsional vibration damper.

In accordance with again an additional feature of the invention, the rotatable shaft projects axially beyond the connecting strand at least towards a side thereof and forms a free end and the vibration damping device is disposed on the free end of the rotatable shaft.

In accordance with still another feature of the invention, there is provided a force-measuring device, at least one of the load device, the test specimen, the measuring device, and the one or more mechanical systems defining a test stand main axis, the measuring device comprising a lever arm operable to be pivoted about the main axis and to which the force-measuring device is coupled, the vibration damping device being a linear vibration damper disposed on the lever arm.

In accordance with a concomitant feature of the invention, there is provided a force-measuring device, at least one of the load device, the test specimen, the measuring device, and the one or more mechanical systems defining a test stand main axis, the measuring device comprising a first lever arm operable to be pivoted about the main axis and to which the force-measuring device is coupled and a second lever arm opposite the first lever arm and being rigidly coupled to the first lever arm, and the vibration damping device being a linear vibration damper disposed on the second lever arm.

Although the invention is illustrated and described herein as embodied in a test stand having a vibration dampener, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIGS. 1 to 5, there are shown exemplary embodiments of different examples for test stands, in which the components are arranged differently. The test stands are suitable for different applications, in each case from the illustrations that follow.

Figure 1:
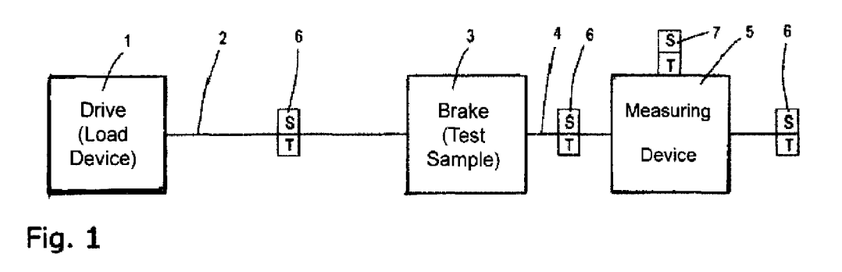
FIG. 1 is a schematic block diagram of a test stand system with an exemplary embodiment of a vibration damper according to the invention.

FIG. 1 shows a brake test stand comprising a drive 1, which serves as load device and which loads a brake 3, which serves as test specimen, via a first connecting strand 2. The drive 1 can be formed, e.g., by a dynamometer, thus, e.g., by a direct current motor. Actually, the brake 3 is not a component of the test stand. Instead, it is inserted in a non-illustrated test specimen accommodation, which serves to support or accommodate, respectively, the brake 3 and which provides corresponding connecting elements for coupling the brake 3 to the remaining test stand and for transmitting the load from the drive 1 to the brake 3.

The brake 3 is coupled to a measuring device 5 via a connecting strand 4. The connecting strand 4 does not need to be a shaft. Instead, only the operative connection in the form of a line is illustrated in FIG. 1 as connecting strand 4. It is also easily possible for the connecting strand 4 to be rigid and for the measuring device 5, e.g., to be next to the brake 3 and to be connected to the brake 3 through a lever device. As a rule, the measuring device 5 will, then, encompass a force-measuring device, but not a measuring flange.

In this respect, the configuration shown in FIG. 1 is a "classic" brake test stand. However, different possibilities for disposing vibration dampers 6, 7 are additionally illustrated in FIG. 1. It is thus possible to provide for torsional vibration dampers 6 in the connecting strand 2 between the drive 1 and the brake 3, at the connecting strand 4 between the brake 3 and the measuring device 5 as well as at the projecting end of the connecting strand 4. As an example, a linear vibration damper 7 is also on the measuring device 5.

The measuring device 5 can be formed, in particular, by a lever arm and by a force-measuring device (e.g., a load cell), which is provided at the end of the lever arm. The braking torque, which is to be supported on the brake 3, which is supported so as to oscillate, can be tapped with the help of the lever arm and can be supported on the load cell as force.

The mode of operation of the vibration dampers 6, 7 will be explained later with the help of concrete examples.

Figure 2:
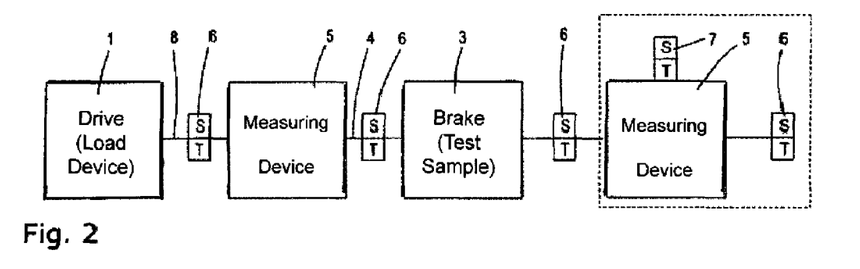
FIG. 2 is a schematic block diagram of a test stand system with an exemplary embodiment of a vibration damper according to the invention.

FIG. 2 shows another exemplary embodiment for a brake test stand according to the invention. The measuring device 5 is between the drive 1 and the brake 3. In this case, the measuring device 5 can be formed, e.g., by a torque-measuring flange. Vibration dampers 6, 7 can be provided, e.g., at a connecting strand 8 between the drive 1 and the measuring device 5, at the connecting strand 4 between the measuring device 5 and the brake 3, at the free end of the connecting strand 4 as well as at the measuring device 5, as is shown in detail in FIG. 2.

The part of the test stand shown in a dotted frame in FIG. 2 is available as an option. The test stand can, therefore, be designed simply only in the form of the components illustrated to the left of the dotted frame in FIG. 2. The components in the frame correspond to the design of a part of the test stand of FIG. 1. The complete test stand, including the components in the dotted frame, provide for a performance measurement, in which a measurement can be carried out in the alternative by a measuring flange (in FIG. 2 the left measuring device 5; the attachment of a vibration damper is not logical there) or by a pendulum block (lever-load cell combination; in FIG. 2 the right measuring device 5).

Figure 3:
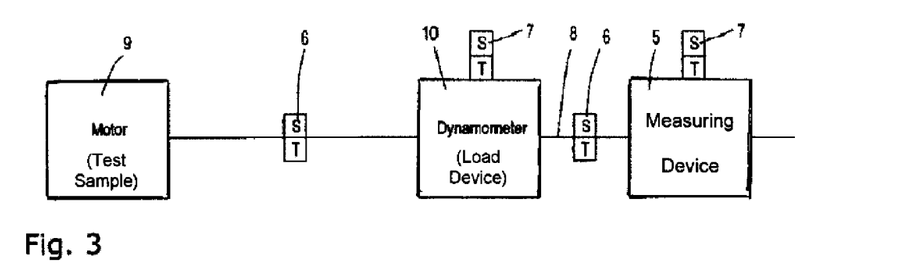
FIG. 3 is a schematic block diagram of a test stand system with an exemplary embodiment of a vibration damper according to the invention.

FIG. 3 shows an engine test stand, which encompasses an engine 9, which is supported in a non-illustrated test specimen accommodation and which serves as a test specimen, a dynamometer 10, which serves as load device, and the measuring device 5. Vibration dampers 6, 7 can also be disposed here in a suitable manner.

Figure 4:
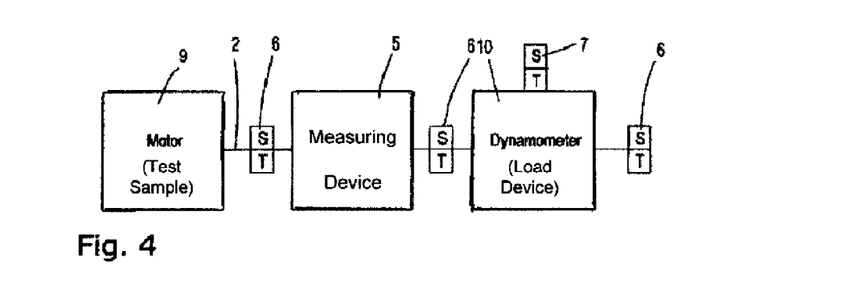
FIG. 4 is a schematic block diagram of a test stand system with an exemplary embodiment of a vibration damper according to the invention.

FIG. 4 shows another engine test stand, in which the measuring device 5—e.g., a torque-measuring flange—is between the motor 9 and the dynamometer 10.

Figure 5:
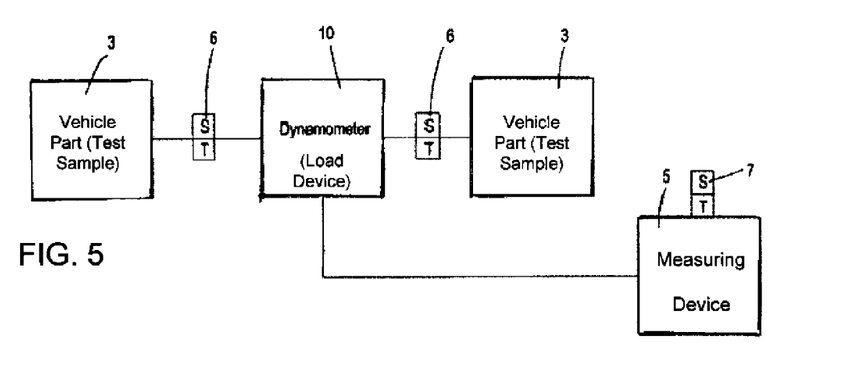
FIG. 5 is a schematic block diagram of a test stand system with an exemplary embodiment of a vibration damper according to the invention.

Finally, FIG. 5 schematically illustrates a rotation test stand as a further exemplary embodiment. The two small boxes, which are identified as "vehicle part (test sample or specimen)" 3 thereby symbolize the test stand rollers, e.g., which roll with the wheels of a motor vehicle that is to be tested. The dynamometer 10, which is typically between the two test stand rollers, then serves as a load device. The measuring device 5, e.g., a load cell, is coupled to the dynamometer 10 through a swing arm, to determine the torque acting on the dynamometer 10.

Torsional vibration dampers 6 are attached respectively to the axes of rotation between the rollers (reference numeral 3) and the dynamometer 10, while provision is made at the swing arm of the measuring device 5 for a linear vibration damper.

Torsional vibration dampers 6 or linear vibration dampers 7 can be disposed at suitable locations in the described alternatives. It applies to all alternatives that provision must be made for a suitable torsional vibration damper 6 and/or a linear vibration damper 7 as the vibration damper in each case as a function of the prevailing vibrations. The torsional vibration damper 6 will, therefore, mainly be practical in the case of rotating components, thus at shafts or shaft ends, while the linear vibration damper 7 is suitable for accommodating vibrations at linearly vibrating components, e.g., at housings or swing arms.

A plurality of vibration dampers 6, 7 are respectively illustrated in FIGS. 1 to 5. It is also easily possible to position only one vibration damper 6, 7 in a test stand, so as to eliminate critical amplitudes at particularly loaded or problematic locations.

Figure 6:
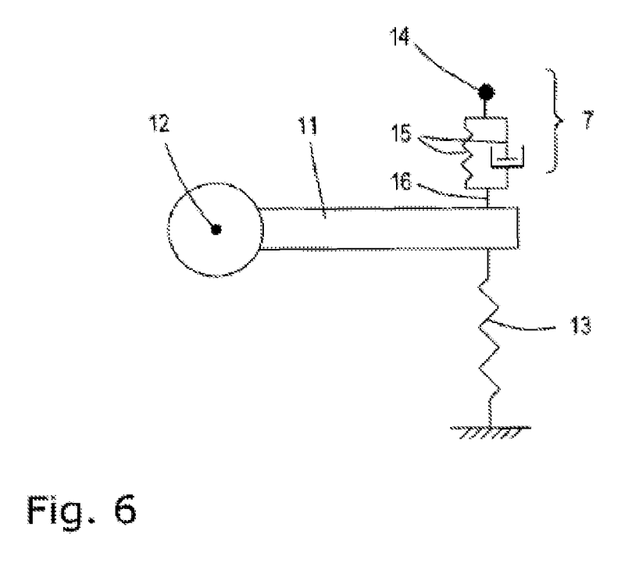
FIG. 6 is a schematic diagram of an exemplary embodiment of a measuring device comprising a vibration damper according to the invention.

FIG. 6 shows a schematic example for the measuring device 5. A lever 11 (lever arm) is pivoted about a main axis 12. The lever 11 can be coupled, e.g., to the outside of a dynamometer or to a brake caliper of the brake 3, so that a torque is transmitted thereto.

A force-measuring device 13, e.g., in the form of a load cell, is disposed on the end of the lever 11 at the bottom side thereof. The load cell encompasses spring characteristics and is thus illustrated in a stylized manner in FIG. 6 as a spring.

A linear vibration damper 7 is furthermore attached to the upper side of the lever 11. On principle, the vibration damper 7 comprises a movably held mass 14, which is coupled to a fastening device 16 via a spring damper system 15. The fastening device 16 is, then, fastened to the lever 11, so that the mass 14 can be moved relative to the lever 11.

The vibration damper 7 eliminates vibration amplitudes in the natural frequency range of the measuring device 5.

Figure 7:
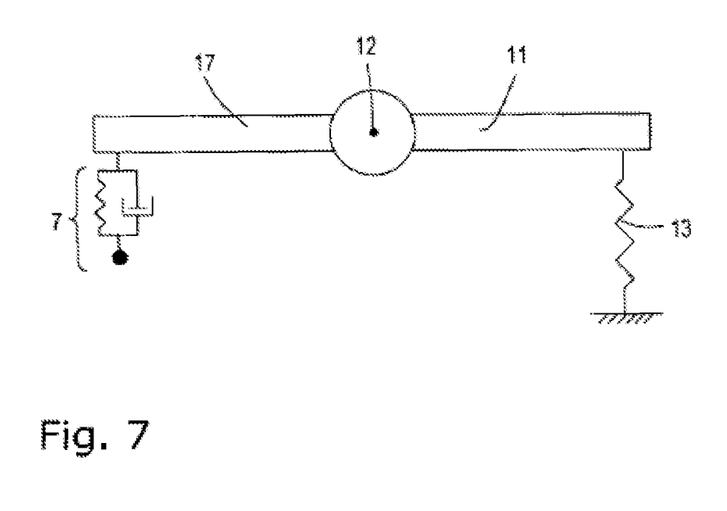
FIG. 7 is a schematic diagram of an exemplary embodiment of another measuring device according to the invention.

FIG. 7 schematically shows an example for an alternative embodiment of the measuring device 5 according to the invention. In this case, the lever arm 11 shown in FIG. 6 is a first lever arm, opposite to which a second lever arm 17 is disposed opposite the main axis 12. Together, the first lever arm 11 and the second lever arm 17 can be embodied in one piece and can form a so-called pendulum block lever arm.

The force-measuring device 13 is disposed on the bottom side of the first lever arm 11, while the linear vibration damper 7 is positioned at the opposite second lever arm 17. It goes without saying that the force-measuring device 13 and the linear vibration damper 7 can also be above the lever arms 11, 17.

The pendulum block comprising the lever arms 11, 17 is coupled to an accommodation, to which a brake caliper of the brake 3 is fastened. When actuating the brake 3, the brake caliper must accommodate a torque, which is transmitted to the force-measuring device 13 through the pendulum block.

Figure 8:
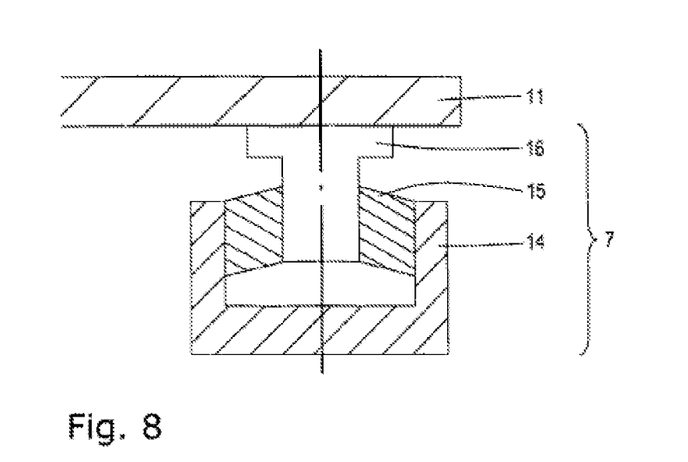
FIG. 8 is a fragmentary, cross-sectional view of an exemplary embodiment of a linear vibration damper according to the invention.

FIG. 8 schematically shows the configuration of a linear vibration damper 7 according to an exemplary embodiment of the invention. The vibration damper 7 encompasses the fastening device 16, which supports the movable mass 14 through the spring-damping device 15. The spring damping device 15 can be formed by an elastomer, for example, rubber or another suitable material. In the ideal case, the mass 14 of the vibration damper is 5% to 10% of the mass of the system that is to be steadied. For space or weight reasons, however, the mass can also be less. The vibration damper 7 can be fastened to the lever arm 11 with the help of the fastening device 16, e.g., in the form of a connecting plate.

Figure 9:
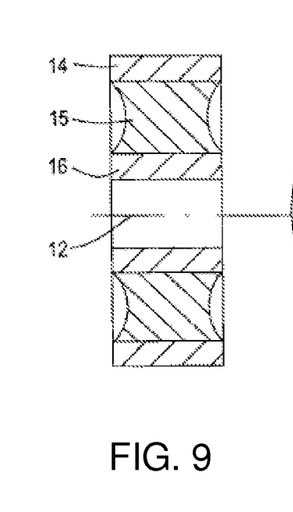
FIG. 9 is a cross-sectional view of an exemplary embodiment of a torsional vibration damper according to the invention.
Figure 10:
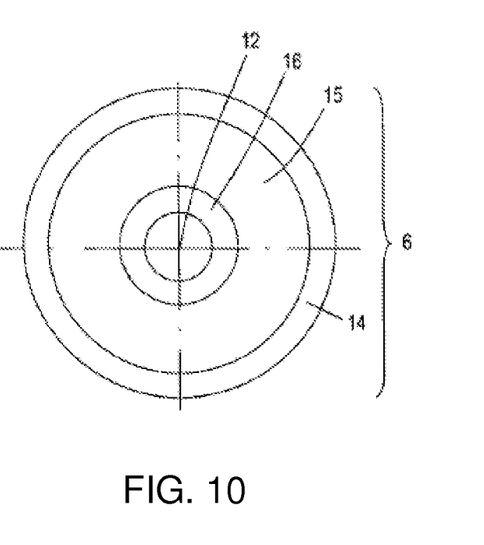
FIG. 10 is a top plan view of the torsional vibration damper of FIG. 9.

FIGS. 9 and 10 show a torsional vibration damper 6 in a sectional view and a front plan view, respectively. For the most part, the torsional vibration damper 6 is disposed about the main axis 12 with a circular symmetry. The fastening device 16 can thereby be embodied as a hub and can be slid onto a drive shaft or onto a corresponding connecting strand between components of the test stand. Through the spring damping device 15, the fastening device 16 supports the mass 14, which is embodied in a ring-shaped manner and which can be moved relative to the fastening device 16 at least relative in the direction of rotation in a relative manner.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A rotation test stand for a test specimen, comprising:
    a load device operable to generate a load for the test specimen;
    a test specimen accommodation configured to accommodate the test specimen and operable to transmit the load from the load device to the test specimen;
    a measuring device operable to measure a measurable variable acting on the test specimen; and
    a vibration damping device comprising one or more mechanical systems and being operable to damp vibrations that arise in any of the load device, the test specimen, the measuring device, and the one or more mechanical systems, the one or more mechanical systems each comprising:
        a fastening device;
        a mass device operable to be moved relative to the fastening device; and
        at least one of a spring device and a damping device operatively disposed between the fastening device and the mass device,
        wherein at least one of the one or more mechanical systems is a linear vibration damper and the mass device comprises a mass operable to be moved back and forth linearly.

2. The test stand according to claim 1, further comprising at least one connecting strand, the vibration damping device being disposed at a location selected from at least one of the group consisting of:
    at a connecting strand between the load device and the test specimen accommodation;
    at a connecting strand between the test specimen accommodation and the measuring device;
    at a connecting strand between the load device and the measuring device;
    at the load device;
    at the test specimen accommodation; and
    at the measuring device.

3. The test stand according to claim 1, wherein the vibration damping device is disposed at a location selected from at least one of the group consisting of:
    at a connecting strand between the load device and the test specimen accommodation;
    at a connecting strand between the test specimen accommodation and the measuring device;
    at a connecting strand between the load device and the measuring device;
    at the load device;
    at the test specimen accommodation; and
    at the measuring device.

4. The test stand according to claim 1, wherein the vibration damping device is disposed at a location selected from at least one of the group consisting of:
    at the load device;
    at the test specimen accommodation; and
    at the measuring device.

5. The test stand according to claim 1, wherein the test specimen accommodation comprises:
    a support operable to support the test specimen; and
    connecting elements operable to couple the test specimen to the test stand and to transmit the load from the load device to the test specimen.

6. The test stand according to claim 1, wherein the vibration damping device comprises at least the one linear vibration damper and at least one torsional vibration damper.

7. The test stand according to claim 1, further comprising a force-measuring device, at least one of the load device, the test specimen, the measuring device, and the one or more mechanical systems defining a test stand main axis, the measuring device comprising a lever arm operable to be pivoted about the main axis and to which the force-measuring device is coupled, the linear vibration damper being disposed on the lever arm.

8. The test stand according to claim 1, further comprising a force-measuring device, at least one of the load device, the test specimen, the measuring device, and the one or more mechanical systems defining a test stand main axis, the measuring device comprising:
a first lever arm operable to be pivoted about the main axis and to which the force-measuring device is coupled; and
a second lever arm opposite the first lever arm and being rigidly coupled to the first lever arm; and
the linear vibration damper being disposed on the second lever arm.

9. The test stand according to claim 1, wherein the vibration damping device is a plurality of vibration damping devices disposed at different locations.

10. The test stand according to claim 9, wherein the different locations are selected from at least one of the group consisting of the load device, the test specimen, the measuring device, and the one or more mechanical systems.

11. The test stand according to claim 1, wherein at least one of the one or more mechanical systems is
a torsional vibration damper and the mass device comprises a mass operable to be moved back and forth so as to rotate about an axis.

12. The test stand according to claim 11, wherein the vibration damping device comprises at least the one linear vibration damper and the one torsional vibration damper.

13. The test stand according to claim 11, wherein: one of:
the load device and the test specimen accommodation are connected by a rotatable shaft;
the test specimen accommodation and the measuring device are connected by a rotatable shaft; and
the load device and the measuring device are connected by a rotatable shaft; and
the torsional vibration damper is disposed on the rotatable shaft.

14. The test stand according to claim 11, wherein:
the load device and the test specimen accommodation are connected by a rotatable shaft;
the test specimen accommodation and the measuring device are connected by a rotatable shaft;
the load device and the measuring device are connected by a rotatable shaft; and
the torsional vibration damper is disposed at at least one of the rotatable shafts.

15. The test stand according to claim 11, further comprising at least one connecting strand comprising a rotatable shaft between at least one of:
the load device and the test specimen accommodation;
the test specimen accommodation and the measuring device; and
the load device and the measuring device,
the torsional vibration damper being disposed on the shaft.

16. The test stand according to claim 15, wherein:
the rotatable shaft projects axially beyond the connecting strand at least towards a side thereof and forms a free end; and
the torsional vibration damper is disposed on the free end of the rotatable shaft.

17. A rotation test stand for a test specimen, comprising:
a load device operable to generate a load for the test specimen;
a test specimen accommodation configured to accommodate the test specimen and operable to transmit the load from the load device to the test specimen;
a measuring device operable to measure a measurable variable acting on the test specimen;
a vibration damping device comprising one or more mechanical systems and being operable to damp vibrations that arise in any of the load device, the test specimen, the measuring device, and the one or more mechanical systems, the one or more mechanical systems each comprising:
a fastening device;
a mass device operable to be moved relative to the fastening device; and
at least one of a spring device and a damping device operatively disposed between the fastening device and the mass device,
wherein at least one of the one or more mechanical systems is a linear vibration damper and the mass device comprises a mass operable to be moved back and forth lineraly; and
at least one connecting strand, the vibration damping device being disposed at a location selected from at least one of the group consisting of:
at a connecting strand between the load device and the test specimen accommodation;
at a connecting strand between the test specimen accommodation and the measuring device;
at a connecting strand between the load device and the measuring device;
at the load device;
at the test specimen accommodation; and
at the measuring device.

18. The test stand according to claim 17, wherein:
the at least one connecting strand comprises a rotatable shaft; and
at least one of the one or more mechanical systems is a torsional vibration damper disposed on the shaft.

19. The test stand according to claim 18, wherein:
the rotatable shaft projects axially beyond the connecting strand at least towards a side thereof and forms a free end; and
the torsional vibration damper is disposed on the free end of the rotatable shaft.

20. The test stand according to claim 17, further comprising a force-measuring device, at least one of the load device, the test specimen, the measuring device, and the one or more mechanical systems defining a test stand main axis, the measuring device comprising a lever arm operable to be pivoted about the main axis and to which the force-measuring device is coupled, the linear vibration damper being disposed on the lever arm.

21. The test stand according to claim 17, further comprising a force-measuring device, at least one of the load device, the test specimen, the measuring device, and the one or more mechanical systems defining a test stand main axis, the measuring device comprising:
a first lever arm operable to be pivoted about the main axis and to which the force-measuring device is coupled; and
a second lever arm opposite the first lever arm and being rigidly coupled to the first lever arm; and
the linear vibration damper being disposed on the second lever arm.

* * * * *